United States Patent [19]
Lester

[11] Patent Number: 5,828,436
[45] Date of Patent: Oct. 27, 1998

[54] EYEGLASS FRAME FORMED FROM A NON-CYLINDRICAL MATERIAL HAVING RESILIENT, DEFORMABLE BELLOWS

[76] Inventor: William M. Lester, 616 S. Orange Ave. Apt. SH2, Maplewood, N.J. 07040

[21] Appl. No.: 710,547

[22] Filed: Sep. 19, 1996

[51] Int. Cl.⁶ .............................. G02C 1/00; G02C 5/14; G02C 5/16
[52] U.S. Cl. .............................. 351/41; 351/111; 351/114
[58] Field of Search .............................. 351/41, 153, 140, 351/114, 111; 15/228

[56] References Cited

U.S. PATENT DOCUMENTS 2,746,087  5/1956  Dolezal ................................... 351/153
4,898,460  2/1990  Magninat et al. ....................... 351/153

*Primary Examiner*—Hung X. Dang
*Attorney, Agent, or Firm*—Jean-Marc Zimmerman

[57] ABSTRACT

An eyeglass frame made as one integral piece from a molded flexible, resilient synthetic material such as a polypropylene plastic which is able to return to its original shape when deformed, wherein said eyeglass frame includes a housing for lenses, and further includes temples which are able to be moved back and forth through 180° in relation to the housing by means of a series of resilient deformations situated at specified spots along the molded material, thereby eliminating the need for screws and/or bolts to couple the temples.

18 Claims, 2 Drawing Sheets

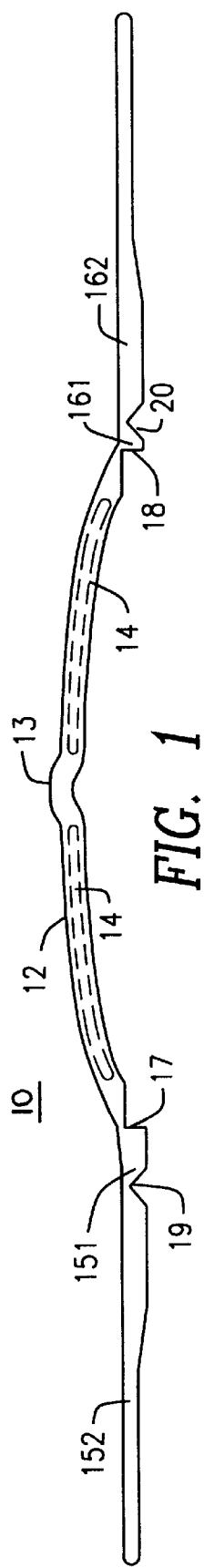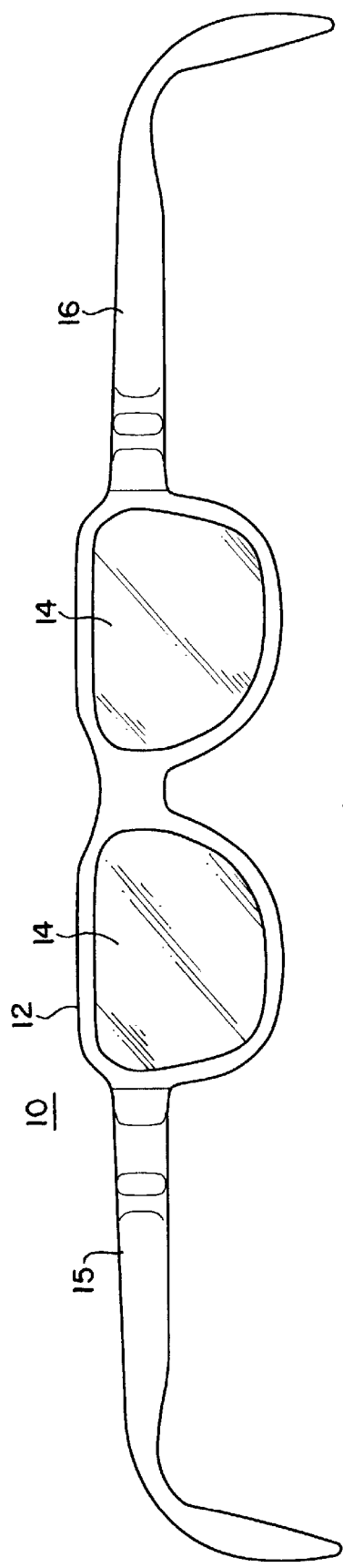

EYEGLASS FRAME FORMED FROM A NON-CYLINDRICAL MATERIAL HAVING RESILIENT, DEFORMABLE BELLOWS

FIELD OF THE INVENTION

This invention relates generally to eyeglass frames and more particularly to an eyeglass frame, including skull temples, which is molded from a resilient thermoplastic material as one integral piece which is able to return to its original shape when deformed.

BACKGROUND OF THE INVENTION

Eyeglass frames are well known and commonly used around the world in conjunction with corrective lenses to aid persons who suffer from vision problems such as nearsightedness or farsightedness. Eyeglass frames are also commonly used in conjunction with tinted lenses as sunglasses to shield a person's eyes from the glare of the sun. Finally, eyeglass frames are also worn by some people as a fashion accessory.

Conventional eyeglass frames typically include a housing which houses the lenses and rests on the bridge of the wearer's nose, and a pair of skull temples which are coupled to the housing and lie along side the wearer's head with the end of each one of said temples resting on the wearer's ears. The temples used in conventional eyeglass frames are typically coupled to the housing by means of screws and/or nuts and bolts. When eyeglass frames are worn, the temples are folded open and are positioned parallel to one another and perpendicular to the housing. When the eyeglass frames are not being worn, the temples can be folded closed, one over the other, down towards the housing so that both temples lie parallel to the housing.

Conventional eyeglass frames suffer from several major drawbacks. First, since such frames are typically fabricated from a rigid, non-flexible metal or plastic material, the frame and/or temples often crack or are otherwise deformed in an unwanted manner as a result of the normal wear and tear associated with wearing the eyeglass frames. Second, the repeated action of folding the temples open and closed in relation to the housing loosens the screws and/or nuts and bolts so that the temples become less securely coupled to the housing and thus more apt to break off or otherwise become decoupled from the housing. In addition, eyeglass frames, and the temples in particular, are often bent out of shape by normal wear and tear. Finally, eyeglass frames are also often damaged by being dropped on the floor, or by being sat on or otherwise unintentionally deformed.

It is, therefore, an object of this invention to provide an eyeglass frame which will overcome the foregoing drawbacks associated with conventional eyeglass frames by utilizing a single strip-like sheet of a flexible, synthetic material having resilient qualities from which to fabricate said eyeglass frame, wherein said strip-like sheet of material includes a series of deformations at specified spots along said strip which allow the temples to be moved through 180° in relation to the housing as opposed to conventional eyeglass frames which can only be moved through 90° in relation to the housing, i.e. between the open and closed positions. The deformations eliminate the need for screws and/or nuts and bolts to couple the temples to the housing. In addition, because the entire strip-like sheet of material is made from a flexible, resilient material, the entire eyeglass frame is more durable and is stronger than conventional eyeglass frames and is thus less likely to be damaged by normal wear and tear or by carelessness on the part of the person wearing the eyeglass frames.

SUMMARY OF THE INVENTION

An eyeglass frame made as one integral piece from a flexible thermoplastic material such as a polypropylene plastic having resilient qualities, wherein said eyeglass frame includes a housing for lenses, and temples which are able to be moved through 180° in relation to the housing by means of a series of molded hinges situated at specified spots along the molded material, thereby eliminating the need to use screws and/or bolts to couple the temples to the housing and thus making the eyeglass frame stronger and more durable than conventional eyeglass frames.

BRIEF DESCRIPTION OF THE DRAWINGS

FIG. 1 shows a top plan view of an exemplary embodiment of an eyeglass frame according to this invention when the temples of said eyeglass frame are aligned parallel to and in the same plane as the housing for the lenses.

FIG. 2 shows a front view of the eyeglass frame shown in FIG. 1.

DETAILED DESCRIPTION OF THE DRAWINGS

Figure 3:
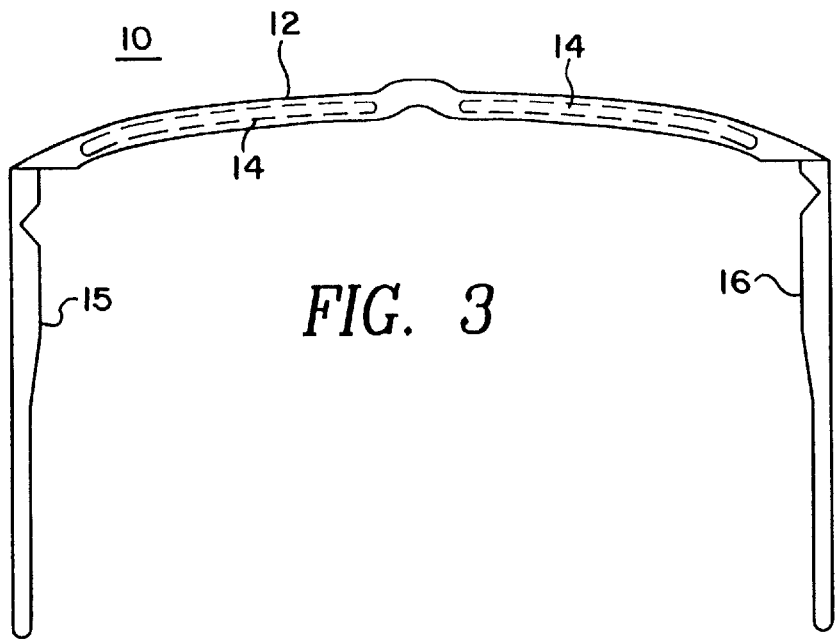
FIG. 3 shows a top view of the eyeglass frame shown in FIG. 1 when the temples are folded perpendicularly in relation to the housing so that the eyeglass frame can be worn.

Referring to FIG. 1 shows a top plan view of an eyeglass frame 10 according to the present invention. Eyeglass frame 10 is molded from a flexible, resilient synthetic material 11 such as, or similar to, polypropylene. Eyeglass frame 10 is comprised of housing 12 which includes nose bridge 13 and lenses 14. Temples 15 and 16 are coupled to frame 12 at deformations 17 and 18, respectively. Temple 15 is comprised of elements 151 and 152, wherein element 151 is coupled to housing 12 at deformation 17 and element 152 is coupled to element 151 at deformation 19. Temple 16 is comprised of elements 161 and 162, wherein element 161 is coupled to housing 12 at deformation 18 and element 152 is coupled to element 151 at deformation 20.

Figure 4:
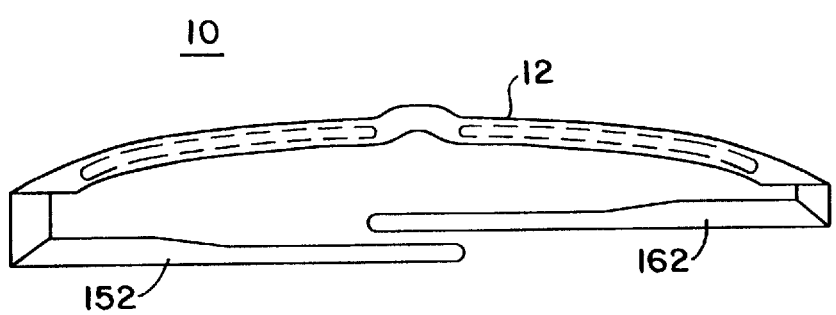
FIG. 4 shows a top view of the eyeglass frame shown in FIG. 1 when the temples are folded down, one over the other, towards the housing so that the eyeglass frames can be stored for safekeeping.

Temples 15 and 16 can be aligned parallel to and in the same plane as housing 12 as shown in FIG. 1. Temples 15 and 16 can also be folded in relation to housing 12 as shown in FIGS. 3 and 4. In particular, temple elements 151, 152, 161 and 162 can be folded from being aligned parallel to and in the same plane as housing 12 through 90° so that they are perpendicular to housing 12, thereby enabling eyeglass frame 10 to be worn. Temple elements 152 and 162 can be folded, one over the other, down towards housing 12 so that they are aligned parallel to and in different planes than both each other and housing 12, and are also perpendicular to elements 151 and 161, thereby enabling eyeglass frame 10 to be stored for safekeeping.

FIG. 2 shows a front view of eyeglass frame 10 shown in FIG. 1.

FIG. 3 shows a top view of eyeglass frame 10 shown in FIG. 1 when temples 15 and 16 are folded perpendicularly in relation to housing 12 so that eyeglass frame 10 can be worn.

FIG. 4 shows a top view of eyeglass frame 10 shown in FIG. 1 when elements 152 and 162 are folded, one over the other, down towards housing 12 so that eyeglass frame 10 can be stored for safekeeping.

It will be understood that the embodiments described herein are merely exemplary and that a person skilled in the art may make many variations and modifications to the described embodiment utilizing functionally equivalent elements to those described. Eyeglass frame 10 can be fabricated from any material which returns to its original shape when deformed. Any variations or modifications to the invention just described are intended to be included within the scope of said invention as defined by the appended claims.

What is claimed is:

1. An eyeglass frame, comprising:

a single molding of a flexible, resilient material having a first end, a second end, and a housing for lenses positioned therebetween, a portion of said molding extending from said first end to said housing and comprising a first temple, a portion of said molding extending from said housing to said second end and comprising a second temple, said first temple being comprised of a first element and a second element, said first element of said first temple extending from said first end to a first deformation positioned along said first temple and said second element extending from said first deformation to a second deformation positioned along said first temple, said first temple being coupled to said housing at said second deformation, said first deformation on said first temple being configured as an angled, non-extendible notch in said first temple, said second temple being comprised of a first element and a second element, said first element of said second temple extending from said second end to a first deformation positioned along said second temple and said second element extending from said first deformation to a second deformation positioned along said second temple, said second temple being coupled to said housing at said second deformation, said first deformation on said second temple being configured as an angled, non-extendible notch in said second temple, each one of said deformations being flexible and resilient, wherein said first and said second temples can be moved in relation to said housing by bending said temples at said deformations.

2. The eyeglass frame according to claim 1, wherein said first and said second temples can be moved perpendicular to said housing by bending said first and said second temples at said second deformations, thereby enabling said eyeglass frame to be worn.

3. The eyeglass frame according to claim 2, wherein said first elements of said first and said second temples can be moved parallel to said housing by bending said first and said second temples at said first deformations, thereby enabling said eyeglass frame to be stored for safekeeping.

4. The eyeglass frame according to claim 1, wherein said flexible, resilient material is a polypropylene or equivalent plastic.

5. The eyeglass frame according to claim 1, wherein said first and said second temples can be moved in relation to said housing so that said temples are aligned parallel to and in the same plane as said housing.

6. The eyeglass frame according to claim 1, wherein said first element of said first and said second temples can be moved parallel to and in a different plane from one another and from said housing, and perpendicular to said second element of said first and said second temples.

7. The eyeglass frame according to claim 1, wherein said first and said second temples can be moved from a first position in which said first and said second temples are aligned parallel to and in the same plane as said housing to a second position in which said second element of said first and said second temples are parallel to one another and are perpendicular to said housing, and said first element of said first and said second temples are parallel to and in a different plane from one another and from said housing and are perpendicular to said second element of said first and said second temples.

8. The eyeglass frame according to claim 7, wherein said temples can be moved back from said second position to said first position.

9. The eyeglass frame according to claim 1, wherein said first and said second temples lie adjacent to the sides of the head of a person wearing said eyeglass frame and said first and said second ends, rest on the ears of said person.

10. An eyeglass frame, comprising:

a single molding of a flexible, resilient material having a first end, a second end, and a housing for lenses positioned therebetween, a portion of said molding extending from said first end to said housing and comprising a first temple, a portion of said molding extending from said housing to said second end and comprising a second temple, a first pair of deformations being positioned along said first temple, a second one of said first pair of deformations being positioned adjacent to said housing and a first one of said first pair of deformations being positioned between said second deformation and said first end, a second pair of deformations being positioned along said second temple, a second one of said second pair of deformations being positioned adjacent to said housing and a first one of said second pair of deformations being positioned between said second deformation and said second end each one of said first deformations being configured as v-shaped, nonextendible notches, said deformations being flexible and resilient, and said first and said second temples being configured to move in relation to said housing by bending said first and said second temples at said deformations.

11. The eyeglass frame according to claim 10, wherein said first and said second temples can be moved perpendicular to said housing by bending said first and second temples at each one of said second deformations, thereby enabling said eyeglass frame to be worn.

12. The eyeglass frame according to claim 11, wherein a portion of said first temple extending from said first one of said first pair of deformations to said first end and a portion of said second temple extending from said first one of said second pair of deformations to said second end can both be moved parallel to said housing by bending said first and said second temples at said first deformations, thereby enabling said eyeglass frame to be stored for safekeeping.

13. The eyeglass frame according to claim 10, wherein said flexible, resilient material is a polypropylene or equivalent plastic.

14. The eyeglass frame according to claim 10, wherein said first and said second temples can be moved in relation to said housing so that said temples are aligned parallel to and in the same plane as said housing.

15. The eyeglass frame according to claim 10, wherein said first and said second temples are each comprised of a first element and a second element, said first element of said first temple extending from said first end to said first one of said first pair of deformations and said second element of said first temple extending from said first deformation to said second one of said first pair of deformations, said first element of said second temple extending from said second end to said first one of said second pair of deformations and said second element of said second temple extending from said first deformation to said second one of said second pair of deformations, said first and said second temples able to be moved perpendicular to said housing by bending said second element of said first and said second temple at each one of said second deformations, said first element of said first and said second temples being able to be moved parallel to and in a different plane from one another and from said housing and perpendicular to said first element of said first and said second temples by bending said first element at each one of said first deformations.

16. The eyeglass frame according to claim 15, wherein said first and said second temples can be moved from a first position in which said first and said second temples are aligned parallel to and in the same plane as said housing to a second position in which said second element of said first and said second temples are parallel to one another and are perpendicular to said housing and said first element of said first and said second temples are parallel to and in a different plane from one another and from said housing and are perpendicular to said second element of said first and said second temples.

17. The eyeglass frame according to claim 16, wherein said first and said second temples can be moved back from said second position to said first position.

18. The eyeglass frame according to claim 10, wherein said first and said second temples lie adjacent to the sides of the head of a person wearing said eyeglass frame and said first and said second ends rest on the ears of said person.

* * * * *